United States Patent [19]

Hauville

[11] Patent Number: 4,946,480
[45] Date of Patent: Aug. 7, 1990

[54] FILTER APPARATUS WITH IMPROVED FILTRATION AND SATURATION LEVEL DETECTOR

[76] Inventor: Francois P. Hauville, 3 Royal Crest Dr., #12, North Andover, Mass. 01845

[21] Appl. No.: 413,280

[22] Filed: Sep. 27, 1989

[51] Int. Cl.$^5$ .................. B01D 53/04; B01D 53/30
[52] U.S. Cl. .................................. 55/270; 55/18; 55/20; 55/21; 55/274; 55/316; 55/320; 55/472; 55/482
[58] Field of Search ............... 55/18, 20, 21, 270, 55/274, 316, 320, 323, 385.2, 472, 482

[56] References Cited

U.S. PATENT DOCUMENTS

| | | | |
|---|---|---|---|
| 3,811,250 | 5/1974 | Flower | 55/274 |
| 4,197,095 | 4/1980 | White et al. | 55/20 |
| 4,793,836 | 12/1988 | Griffis | 55/274 X |
| 4,810,269 | 3/1989 | Stackhouse et al. | 55/274 X |

*Primary Examiner*—Charles Hart
*Attorney, Agent, or Firm*—Edward A. Gordon

[57] ABSTRACT

An apparatus for removing contaminants generated in a volume of air contained within a work structure includes a housing, an inlet aperture disposed in the housing for receiving the contaminated air generated in the structure, an outlet aperture for passing of filtered air disposed in another portion of the housing removed from the inlet aperture and a plurality of removable interchangeable filter units disposed in the housing in spaced relationship between the inlet and outlet apertures thereby forming a plurality of chambers each defined by adjacent filter units and the housing. A detector device is engaged with at least the first chamber adjacent the inlet aperture for detecting the level of concentration of contaminants in the air passing through the chamber. The apparatus also includes a fan device to direct the contaminated air from within the work structure through the inlet aperture of the housing whereby the contaminated air passes through each filter unit and intermediate detection chambers for removal of at least a portion of the contaminants, and then to direct the filtered air through the outlet aperture. In a preferred embodiment the fan device is positioned adjacent the inlet aperture for the purpose of increasing the pressure of air passing through the filter units to thereby optimize the filter capacity of the filter units.

20 Claims, 5 Drawing Sheets

FILTER APPARATUS WITH IMPROVED FILTRATION AND SATURATION LEVEL DETECTOR

BACKGROUND OF THE INVENTION

1. Field Of The Invention

The present invention relates to apparatus for the removal or filtration of contaminants such as toxic gases, vapors, molecules, particles, dust and unpleasant smelling substances generated in air contained within a particular structure or working chamber and more particularly to a new and improved apparatus which provides for the optimization of the filtration or removal of such contaminants including improved safety of operation by a self-contained system without ducting.

2. Description Of Prior Art

It is well known to filter contaminated air by passing the contaminated air through a filter by a fan in order to filter out gases generated in the working chamber of a laboratory fume hood and to exhaust the filtered air back into the room where the users are present. Such prior art hood apparatus provides advantages in that they avoid the construction of costly exhaust ducts, the contamination or pollution of the atmosphere, and the consuming, by ducting to the outside, of cooled or heated air provided in the room where the hood apparatus is operated.

While such ductless prior art devices have provided improvements in certain areas there still exists numerous disadvantages.

For example, the prior art ductless fume hoods are limited in their use when the contaminants to be removed are toxic gaseous molecules. It is well known that in accordance with the inter-molecular attraction forces of the Van der Waals phenomena, when a filter such as, for example, an activated carbon filter or molecular sieve, is saturated by the accumulation of toxic molecules, the excess toxic molecules pass through the filter uninhibited. The prior art devices do not provide for any indication of the moment when filters become saturated and thereafter permit toxic contaminants to pass through the filter thereby creating a safety hazard. Even if it is assumed that a detector is used for the detection of the toxic molecules which have passed through the saturated filter, the user may be in a position where he still has to carry on with the work (which generates the toxic molecules) until completed. This could result in recirculating intolerable quantities of toxic air into the air of the room where the user is present.

Additionally, present detectors of contaminants have the disadvantage of reacting only in the presence of certain gas contaminants and in some cases only at a level of concentration which is intolerable for the users. Therefore their use is limited to the detectable gas contaminants, the threshold detection level of which is lower than the tolerable or safe threshold level of toxicity.

It is also known that the punctual (non-permanent) detectors of toxic gases, such as, for example, the common color reacting sampling test tubes are inexpensive and easy to use. They provide detection for a wide range of toxic compounds of different families but they cannot be used for the ductless filtering fume hoods due to the fact that their capacity for the detection of the saturation of the filters is of a single use for a very short period of time consisting of a few minutes, by sampling of the air exhausted by the hood.

In other words, a system of punctual detection, such as, for example, the color reacting sampling test tubes, have the advantage of an ideal scope of detection for various toxic gases and vapors and of a good accuracy in the reading of the concentrations of the sampled toxic compounds, but they unfortunately have the disadvantage to force the user to do continual repeated air samplings (at least once a day) in order to cyclically evaluate the quality of the filtration, which renders this system difficult to use for ductless filtering fume hoods.

Furthermore, it is well known that the ductless filtering and air recirculating fume hoods can ensure a proper filtration only within the limits of a quantity of toxic compounds equal to the remaining retention or saturation capacity of the filter. Therefore, if by accident after a spillage or a leak of toxic compounds, the quantity released within the working chamber was to exceed the remaining retention capacity of the filter, this would lead to discharge of toxic molecules into the room where laboratory technicians are. This disadvantage renders safety practically impossible in the case of an accident. In fact, if such an accident was to happen when the filter is at the extreme limit of its working life, it would not withstand any further overloading of toxic molecules and would not ensure a proper filtration.

The present state of the art is exemplified in the following U.S. Pat. Nos.:

| | | |
|---|---|---|
| 4,678,489 | 4,563,943 | 4,666,478 |
| 4,690,042 | 4,163,650 | 4,268,282 |

Accordingly, a principle desirable object of the present invention is to overcome the disadvantages of the prior art.

Another desirable object of the present invention is to provide an apparatus for removing or filtering contaminants generated in a volume of air contained in a work structure and which optimizes the effectiveness of contaminant filters.

Another desirable object of the present invention is to provide an apparatus of the foregoing objects which is constructed and arranged to employ common detectors of contaminants such as toxic gases efficiently and safely.

Another desirable object of the present invention is to provide a new and improved ductless portable fume hood having revolving, removable and interchangeable filter cartridges.

These and other desirable objects of the invention will in part appear hereinafter and will in part become apparent after consideration of the specification with reference to the accompanying drawings and the claims.

SUMMARY OF THE INVENTION

The present invention discloses a new and improved apparatus for the removal or filtering of contaminants generated in a volume of air contained within a work structure. More specifically, in accordance with the present invention, the apparatus comprises a housing having an inlet aperture for receiving the contaminated air and an outlet aperture for passing of filtered air. Disposed within the housing are at least two filter devices preferably having similar dimensions and capacities. The filter devices are placed in series in spaced relationship to each other to thereby form a chamber intermediate the filter devices. The intermediate chamber has a lateral dimension similar to the adjacent surfaces of the filter devices and a longitudinal dimension preferably equal to the filter devices which together define the volume of the intermediate chamber which serves as a detection chamber. Attached to the detection chamber is at least one removable detection device which serves to determine the level of concentration of contaminants in the air entering the detection chamber through the filter device on the side adjacent the inlet aperture. The intermediate detection chamber and detection device serve to determine the quality and quantity of the filtration of the adjacent filter. This feature enables the user to determine when the adjacent filter (the first filter in this apparatus "down stream" from the inlet aperture) is saturated so that it may be replaced as discussed hereinafter. The second filter device positioned on the other side of the intermediate detection chamber (down stream from the inlet aperture) ensures that any contaminants passing through the intermediate detection chamber will be absorbed by the second filter device thereby providing a period of time between the saturation of the first filter device and the second filter device before the contaminants are able to emit through the second filter device. This period of time (hereinafter sometimes called the emission time for simplicity of discussion) provides the following advantages:

(a) permits the detection of toxic contaminants with detector of the permanent type or of the cyclic sampling type a having a sensitivity requiring a concentration of toxic contaminants which would be intolerable if recycled to the air in the room of the user as discussed with respect to prior art devices;

(b) permits additional operating time for the user beyond the time when the first filter device becomes saturated when indicated by the detector of the intermediate detection chamber; and (c) permits the filtering of excessive amounts of toxic contaminants which exceed the capacity of the first filter device in an accidental situation which causes the release of a massive amount of toxic contaminants.

The filter apparatus of the present invention also includes an air moving device such as, for example, a fan to move the contaminated air from within the structure or work chamber through the inlet aperture and into the housing chamber whereby the contaminated air passes through the first and second filter devices and intermediate detection chamber for removal of at least a portion of the contaminants, and then to move the filtered air through the outlet aperture.

It is to be understood that the present invention contemplates a filter apparatus which includes a plurality of filter devices and associated intermediate detection chambers.

In a preferred embodiment of the present invention, the filter apparatus is constructed and arranged so that the filter devices are interchangeable as well as changeable. The interchangeable feature of the present invention provides for a more efficient use of the filter devices. For example, when the first filter device adjacent the inlet aperture is saturated as indicated by the detector device, it can be removed and replaced or interchanged by the second filter device, that is the next one down stream from the inlet aperture, the saturation capacity of which is not yet reached. In this example the second filter device is replaced with a new filter device or in the case where there are more than two, revolved with the next one down stream. This feature of the invention permits the disposal of only the first up stream filter device, the saturation of which is certain, and to replace it with the second down stream filter device, the saturation of which is not yet reached. In this manner, only the last filter device down stream will be replaced by a new filter device thereby ensuring the prevention of toxic or other contaminants from passing through the outlet aperture.

In a preferred embodiment of the present invention, the air moving device such as a fan is placed at the up stream end of the filter devices adjacent the inlet aperture. In this manner the filter devices function in compression by the pushing of the air through the filter devices with an up stream air moving device which creates air pressure particularly with respect to the down stream filters and detection chambers. This feature of the present invention, which creates air pressure of the contaminated air in contact with the filter devices, enhances the filtration capacity of the filters in contrast to the prior art devices which create a depression or lack of air pressure in the filters which reduces the capacity of the filters by decreasing the boiling temperature of the contaminant molecules and by reducing the concentration of such molecules.

The air pressure provided by the present invention acts positively on the effects of adsorption of the contaminant molecules or particles by the filter devices as follows:

(a) increase of the time of contact of the toxic molecules in the adsorption columns of the filters through the decrease of the air velocity resulting from the reduction of the volume of the air due to its compression.

(b) increase of the phenomena of chemisorption caused by a higher concentration of the toxic molecules due to the compression of the volumes of air containing them.

(c) increase of the boiling temperature of the molecules through the increase of the air pressure which favors the captation of the molecules in accordance with Van der Waals law of attraction forces. The increase of the boiling temperature also allows molecules, the boiling temperature of which is low and which would not ordinarily be retained in the adsorption column of a filter, to be attracted and adsorbed by the filter as a result of the increased boiling temperature thereby increasing the filtering capacity.

BRIEF DESCRIPTION OF THE DRAWING(S)

For a fuller understanding of the nature and desired objects of the invention, reference should be had to the following detailed description taken in connection with the accompanying drawings wherein like reference characters denote corresponding parts throughout the several views and wherein.

DETAILED DESCRIPTION OF PREFERRED EMBODIMENT(S)

It is to be understood that while the present invention will be described primarily with respect to ductless portable fume hoods it is not limited in such use.

Figure 1:
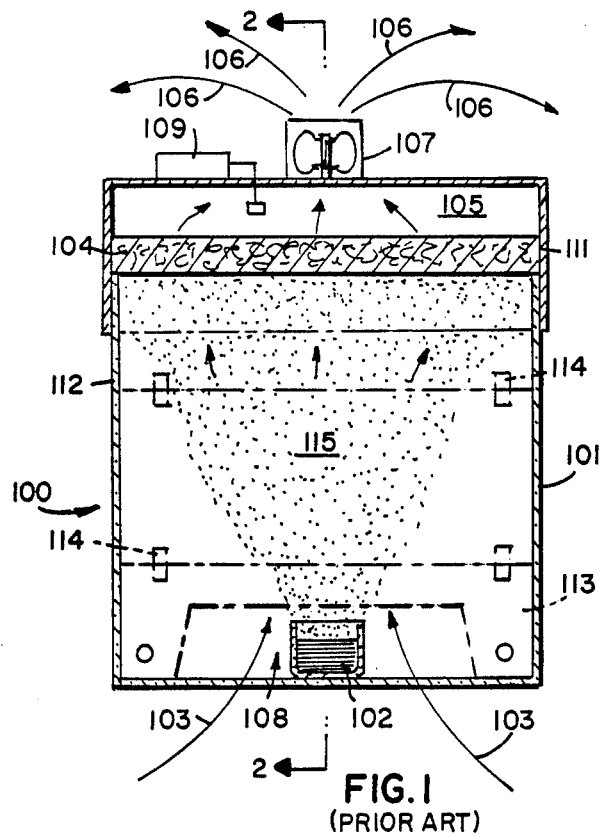
FIG. 1 is a front cross-sectional view of a prior art ductless fume hood.
Figure 2:
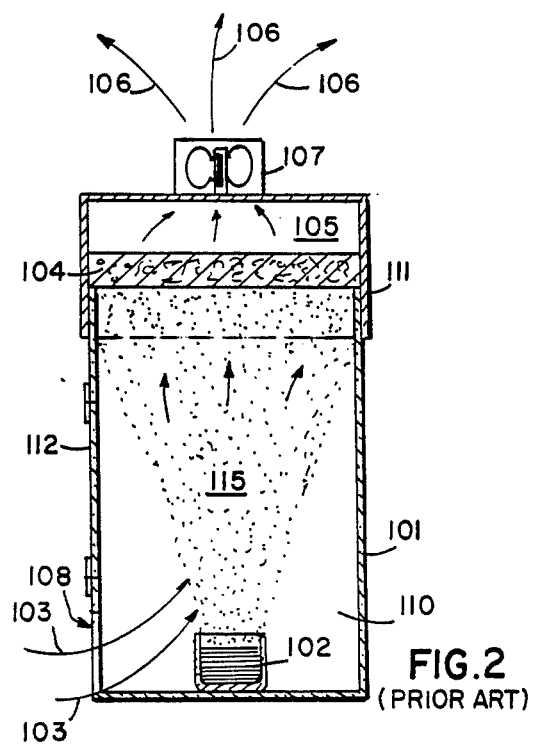
FIG. 2 is a cross-sectional view taken along the line 2—2 of FIG. 1.

As illustrated in FIGS. 1 and 2, the typical prior art ductless fume hood indicated generally by the reference numeral 100 comprises a housing 101 having a work chamber 110 containing a source 102 which, for example, generates a toxic gas contaminant 115. The housing is provided with access panels 112 and 113 attached by hinges 114. A filter 104 formed of activated carbon, for example, is positioned in the top portion 111 of the housing 101 above the source of toxic gas. A chamber 105 is positioned above the filter 104. Attached to the housing forming the upper portion of the chamber 105 is a fan device 107 for drawing the ambient air represented by the arrows 103 into the work chamber 110 through the opening 108 and thereafter drawing the ambient air and toxic gas 115 up through the filter 104 and out through the fan apparatus as exhaust air 106. Attached to the housing of chamber 105 is a permanent detector device 109 for detecting the level f toxic gas contaminants in chamber 105. It is believed to be readily apparent that the construction and arrangement of the prior art ductless filter devices do not provide for any indication of the moment when the filter 104 becomes saturated and thereafter permit toxic contaminants to pass through the filter and exit as part of the exhaust air 106 as discussed hereinbefore with respect to prior art devices.

Referring now more particularly to FIGS. 3A-5, there is illustrated an embodiment of a ductless fume hood, indicated generally by the reference numeral 10, employing the principles of the present invention. The ductless fume hood 10 comprises a work chamber structure indicated generally by the bracket and reference numeral 12 and the filter apparatus indicated generally by the bracket and reference numeral 14. The work chamber structure 12 comprises side walls 16 and 18, bottom wall 20 and back wall 22. The front wall is formed of an upper panel 24 attached to the upper portion 26 of the front wall by hinges 28 and a lower panel 30 connected to the upper panel 24 by hinges 32 to provide access to the interior 11 of the work chamber 12. The lower panel 30 is provided with an opening 34 to permit the ambient air indicated by the arrows 36 to enter the work chamber 12 as discussed hereinafter. The front and side walls of the structure 12 are preferably formed of transparent plastic or plexiglass to permit the user or operator to view the interior 11 of the work chamber 12. The rear or back wall 22 can be formed of a suitable material such as plastic, plexiglass, wood, metal or combinations thereof.

Figure 3A:
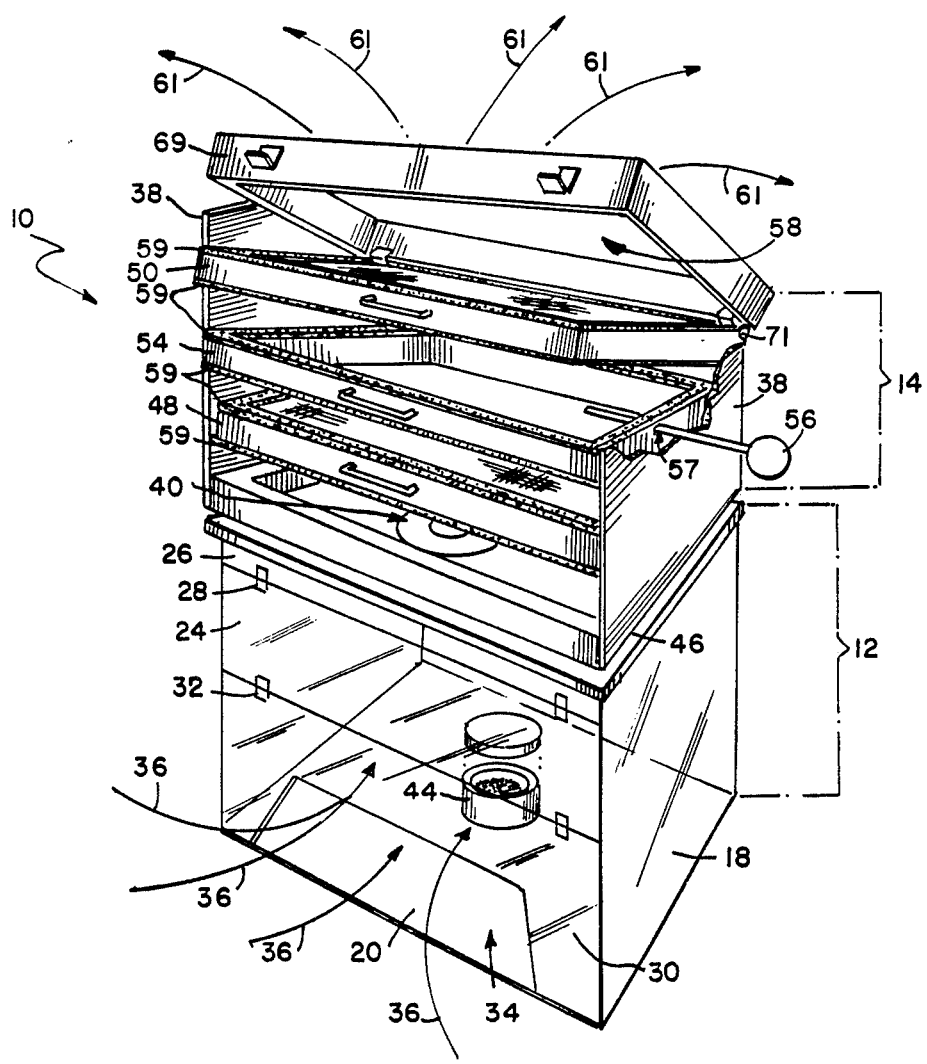
FIG. 3A is a fragmentary perspective of an embodiment of a filter apparatus employing the principles of the present invention.
Figure 3B:
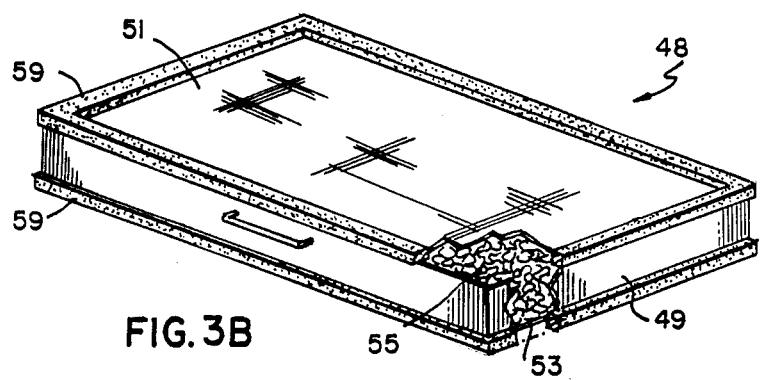
FIG. 3B is a fragmentary perspective view of the filter device shown in FIG. 3A.
Figure 3C:
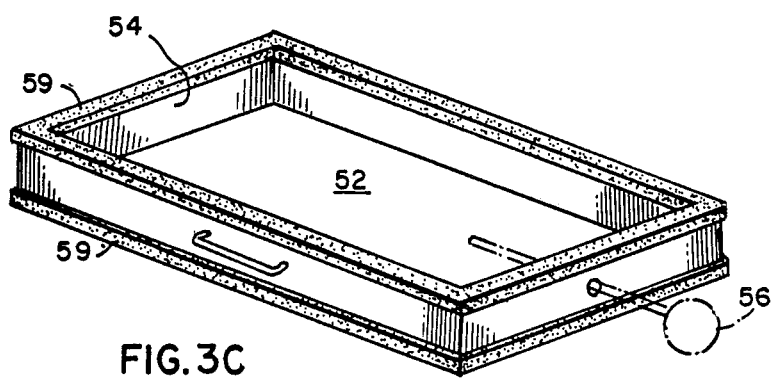
FIG. 3C is a perspective view of the intermediate detector frame structure shown in FIG. 3A.
Figure 4:
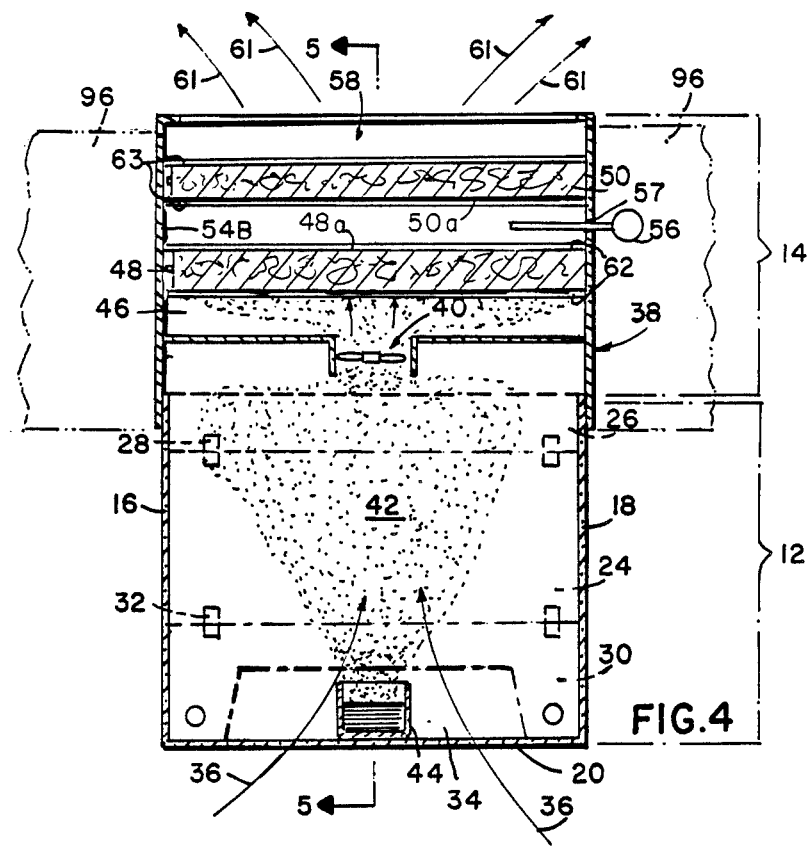
FIG. 4 is a front cross-sectional view of a modified embodiment of the filter apparatus of FIG. 3A.
Figure 5:
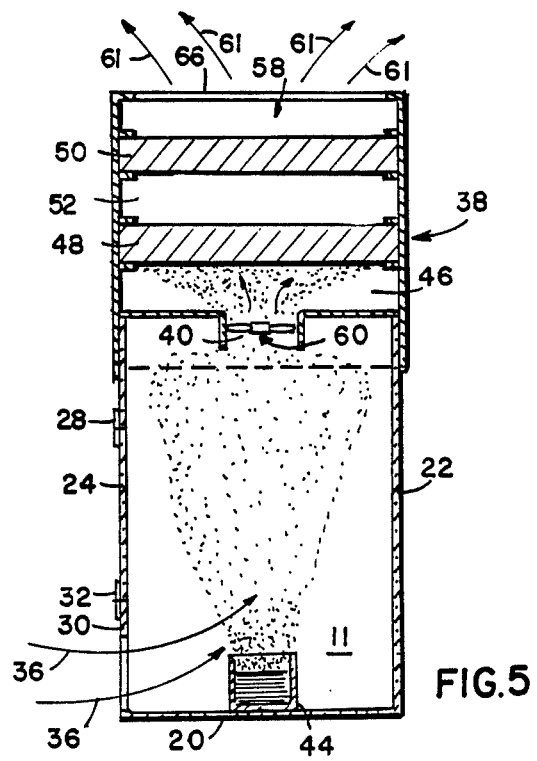
FIG. 5 is a cross-sectional view taken along the line 5—5 of FIG. 4.

The ductless filter apparatus 14 comprises a housing 38 provided with an inlet aperture 40 for passage into the housing 38 of the contaminated air 42 generated by the work device 44 in the work chamber 12. Preferably an extractor chamber 46 is positioned adjacent the inlet aperture 40 to receive the contaminated air 42 extracted from the work chamber 12. The extractor chamber 46 disburses contaminated air 40 within the chamber 46 so as to insure contact with the entire area of the first filter unit 48 for removing contaminants from the air 42. As mentioned the first filter unit 48 is positioned adjacent the extractor chamber 46 and delimits the upper boundary of the extraction chamber 46. As best seen in FIG. 3B, the filter unit 48 includes a frame member 49 having a perforated top panel member 51 and a corresponding perforated bottom panel member 53. Disposed within the filter unit 48 is a filter material 55 as discussed hereinafter. Disposed about the upper and lower peripheral edges of the filter unit 48 is a seal member 59 which can be formed of natural or synthetic elastomeric material and which serves to form an air tight seal when the filter is in operation within the apparatus. A second filter unit 50, similar to filter unit 48, for removing contaminants from the air 42 passing therethrough is positioned in spaced relationship from the first filter 48 so as to form or provide a space for an intermediate detection chamber 52 therebetween. As illustrated in FIGS. 3A and 3C, the filter chamber space 52 is defined by the frame member 54 which is also provided with a peripheral air tight seal member 59. As used in the embodiment of the invention shown in FIG. 3A, the frame member 54 when stacked intermediate the filter units 48 and 50 is delimited by the frame member 54 and the adjacent panel surfaces 48a and 50a of the filter units 48 and 50. In the modified embodiment shown in FIGS. 4 and 5, the intermediate chamber 52 is delimited by the adjacent surfaces, 48a of filter unit 48, and 50a of filter unit 50, and the portion 54B of the housing 38 defined by the spaced support members 62 and 63 extending from the housing 38. A device 56 for detecting the level of concentration of contaminants in the air passing through the first filter unit 48 is removably attached to the frame 54 (FIG. 3A) or the portion 54B (FIG. 4) of the housing by conventional aperture and airtight seal 57 and extends into the chamber 52. One type of suitable detector device 56 is a non-permanent or temporary gas and vapor detector tube produced by NATIONAL DRAEGER. An outlet aperture 58 for exhaust air 61 is provided in and delimited by the upper portion 69 of the housing adjacent the filter unit 50. An air moving device 60 illustrated as a fan is attached in the extractor chamber 46 adjacent the inlet aperture 40. The fan is driven by an associated conventional electric motor and an on/off activation switch(not shown). As mentioned with respect to FIGS. 4 and 5, the interior of the housing member 38 can be provided with support members 62 and 63 to support the filter units and permit the filter units to be slidably removed from the housing and revolved, replaced, and interchanged. As shown in FIG. 3A the filter units 48 and 50 and detection chamber frame 54 can be removed, revolved and interchanged from their stacked positions. In the stacked embodiment shown in FIG. 3A, the frame portion 69 is pivotally attached to the housing 38 by hinge member 71 and has sufficient weight so as to maintain the stacked filter units 48 and 50, intermediate chamber 54 and extractor chamber 46 in air tight relationship when in the closed operating position. It is to be understood that while FIG. 3A illustrates the filter apparatus section 14 as being formed of stacked sections, the filter apparatus can comprise a nonstacked arrangement (as shown in FIGS. 4 and 5) which can also be provided with a pair of air tight doors 66 as shown by the dotted lines of FIG. 4.

Figure 6:
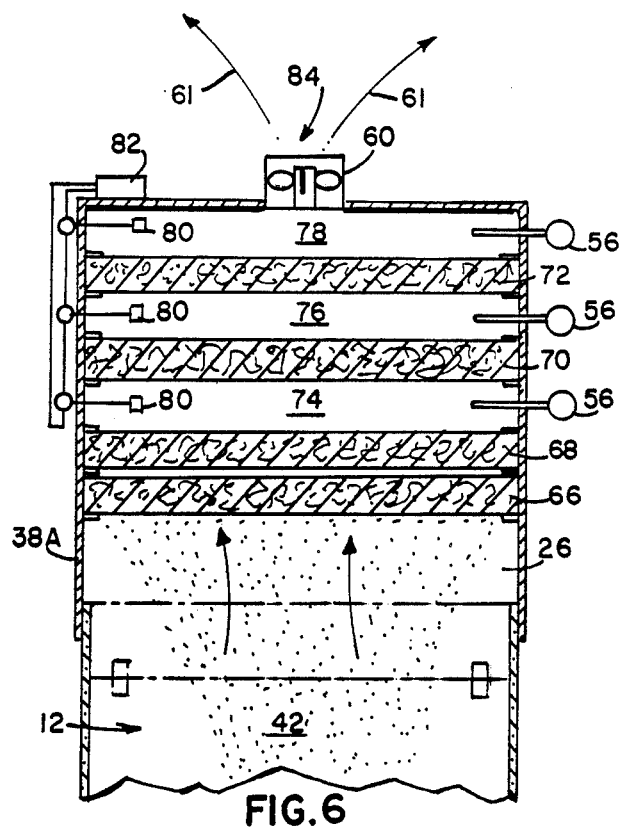
FIG. 6 is a fragmentary cross-sectional view of a second embodiment of a filter apparatus in accordance with the present invention.

Referring now to FIG. 6, there is illustrated an alternate embodiment of the filter apparatus of the invention. The apparatus is similar to that of FIGS. 4 and 5 except that within the filter apparatus housing 38A there is provided a plurality of filter units 66, 68, 70 and 72 with detector chambers 74, 76 and 78. In accordance with the invention the filter units can be formed of different conventional filter materials(50 FIG. 3B) to perform filtering of different contaminant materials. For example, a fiber filter or a static electrical filter for solid particles; a catalytic filter for gaseous molecules; and an adsorption filter such as activated carbon, alumina, or silica gel. It is understood that the number and type of filters can be selected depending upon the contaminants to be released and filtered. In this embodiment each detection chamber is provided with a permanent detector 80 and a punctual or single detection device 56. The permanent detectors are each connected to a signal device 82. A suitable permanent or reusable detector is the combustible gas detector produced by NATIONAL DRAEGER. Additionally, in this embodiment the fan device 60 is positioned adjacent the outlet aperture 84.

Figure 7:
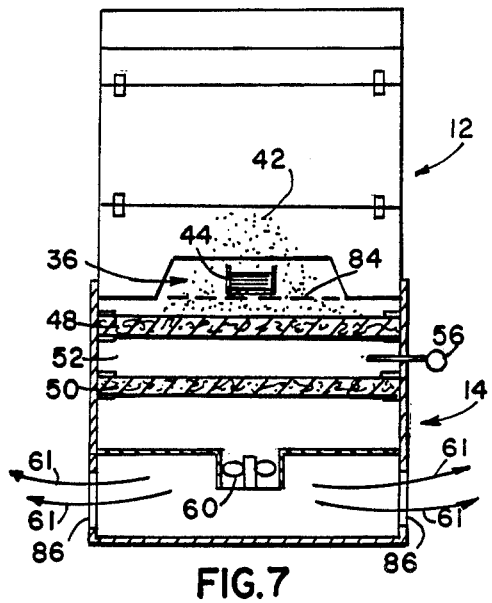
FIG. 7 is a sectional view of a third embodiment of a filter apparatus in accordance with the present invention.

Referring now to FIG. 7, there is illustrated a third embodiment of the present invention. This embodiment is similar to the embodiment described with respect to FIGS. 4 and 5 except that the work chamber section 12 is positioned above the filter apparatus section 14. Additionally the fan device 60 positioned below the filter units 48 and 50 and in operation draws the air 42 downward through the grated base panel 84 and moves the exhaust air 61 through the side outlet apertures 86.

Figure 8:
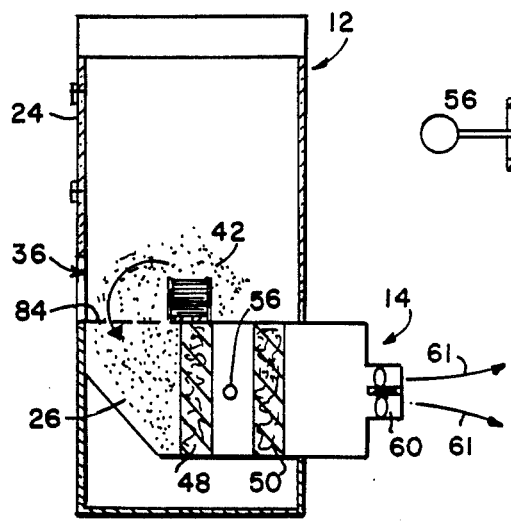
FIG. 8 is a sectional view of a fourth embodiment of a filter apparatus in accordance with the present invention.

Referring now to FIG. 8, there is illustrated a fourth embodiment of the present invention. This embodiment is similar to that of FIG. 7 except that the filter apparatus section 14 is positioned at a right angle to the work chamber section 12 with the fan device 60 moving the exhaust air 61 in a rearward direction.

Figure 9:
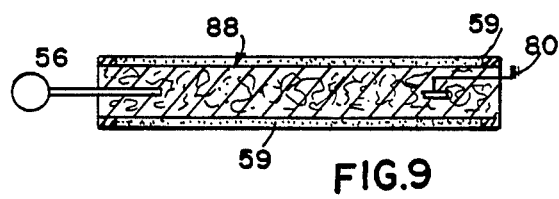
FIG. 9 is a cross-sectional view of the contaminant detector in accordance with the present invention.

As shown in FIG. 9, the present invention contemplates a filter unit 88 in which one or more detector devices such as, for example, temporary detector 56 and permanent detector 80 are inserted into the filter unit in order to determine the level of concentration of contaminants contained in the filter.

The present invention is suitable for numerous uses and application including laboratory uses involving the handling of various chemical materials which include or produce toxic and non-toxic gases, vapors, particles, dust and unpleasant odors.

In operation of an apparatus of the type illustrated in FIGS. 4 and 5, for example, the air moving fan device 60, when activated, draws the air 42 from within the work chamber 12 in addition to the ambient air 36 and drives or pushes the air at a positive pressure successively through the first filter 48, the detection chamber 52, the second filter device 50 and then through the outlet aperture 66 into the ambient air as shown by the arrows 61 which represents the exhaust air. During the passage of the air through the filter units, the air is filtered and cleaned to a sufficient extent to permit it to be passed to the ambient air or room environment. When the detector 56 indicates a predetermined level of contaminants in the air in the intermediate detection chamber 52 (representing, for example, the saturation of the first filter unit 48), the work carried on in the work chamber is then terminated. If the termination process requires additional time, the second filter 50 provides filtration of the air. At the termination point, the first filter 48 is removed, the second filter 50 is moved into the first filter position and a new filter is placed in the second filter position. The apparatus is then operated until the first filter (formerly the second filter) is saturated at which point the filter exchanges and replacement process is repeated. The apparatus is operated in the same manner when the apparatus has multiple filters and intermediate detection chambers as illustrated in FIG. 6.

While it has been found that by locating the fan devices adjacent air inlet apertures, creates positive air pressure in the filter units and substantially enhances the filtration capacity of the filters, the present invention still provides enhanced filtration capacity of the filter(s) when the fan device is placed adjacent the outlet aperture (whereby the contaminant air is drawn through at a relative negative air pressure) since the detection devices of the detection chambers permit operation until the filters are sequentially saturated and replaced.

While the invention has been described with respect to preferred embodiments, it will be apparent to those skilled in the art that changes and modifications may be made without departing from the scope of the invention herein involved in its broader aspects. Accordingly, it is intended that all matter contained in the above description, or shown in the accompanying drawing shall be interpreted as illustrative and not in limiting sense.

What is claimed is:

1. An apparatus for removing contaminants generated in a volume of air contained within a structure, said apparatus comprising:
   a housing;
   an inlet aperture disposed in said housing for receiving the contaminated air generated in the structure;
   an outlet aperture for passing of filtered air disposed in another portion of said housing removed from said inlet aperture;
   a plurality of removable interchangeable filter means disposed in said housing in spaced relationship between the inlet and outlet apertures thereby forming a plurality of chambers each defined by adjacent filter means and the housing;
   detector means engaged with at least the first chamber adjacent the inlet aperture for detecting the level of concentration of contaminants in the air passing through said chamber; and
   means to direct the contaminated air from within said structure through the inlet aperture of said housing whereby the contaminated air passes through each filter means and intermediate chambers for removal of at least a portion of the contaminants, and then to direct the filtered air through said outlet aperture.

2. The apparatus according to claim 1 wherein the means to direct the contaminated air is positioned adjacent the inlet aperture for the purpose of increasing the pressure of air to provide a positive pressure of air passing through the filter means.

3. The apparatus according to claim 2 wherein the position of the air directing means increases the time of contact of the contaminant molecules with the filter means through the decrease of air velocity resulting from the reduction of the volume of the air provided by the compression of the air by the positive pressure.

4. The apparatus according to claim 2 wherein the position of the air directing means increases chemisorption resulting from increased concentration of the contaminated air provided by the compression of said air by the positive pressure.

5. The apparatus according to claim 2 wherein the increase in positive pressure resulting from the position of the air directing means raises the boiling temperature of certain low boiling temperature contaminant molecules thereby resulting in increased adsorption by the filter means.

6. The apparatus according to claim 1 wherein the filter means is selected from the group comprising a particulate filter, a catalytic filter, an adsorption filter and combinations thereof.

7. The apparatus according to claim 1 wherein the means to direct the contaminated air is positioned adjacent the outlet aperture whereby the contaminated air generated in the structure is drawn through the filter means.

8. The apparatus according to claim 1 wherein the detector means is used for the purpose of determining when a filter means positioned upstream and adjacent thereto is saturated with the contaminants.

9. An apparatus for removing contaminants generated in a volume of air contained within a structure, said apparatus comprising:
  a housing;
  an inlet aperture disposed in said housing for receiving the contaminated air generated in the structure;
  a first filter means for removing contaminants from air passing therethrough disposed in the housing adjacent said inlet aperture;
  a second filter means for removing contaminants from air passing therethrough positioned in spaced relationship from said first filter means and defining an intermediate chamber between said first and second filter means;
  detector means engaged with said intermediate chamber for detecting the level of concentration of contaminants in the air passing through said chamber;
  an outlet aperture disposed said housing for passing filtered air; and
  means to direct the contaminated air from within said structure through the inlet aperture of said housing whereby the contaminated air passes through said first and second filter means and intermediate chamber for removal of at least a portion of the contaminants, and then to direct the filtered air through said outlet aperture.

10. The apparatus according to claim 9 wherein the means to direct the contaminated air is positioned adjacent the inlet aperture for the purpose of increasing the pressure of air passing through the filter means.

11. The apparatus according to claim 9 wherein the means to direct the contaminated air is positioned adjacent the outlet aperture whereby the contaminated air generated in the structure is drawn through the filter means.

12. The apparatus according to claim 9 wherein the detector means is used for the purpose of determining when a filter means positioned upstream and adjacent thereto is saturated with the contaminants.

13. A ductless apparatus for removing contaminants generated in a volume of air contained within a work structure, said apparatus comprising:
  a housing;
  an inlet aperture disposed in said housing for passage into the housing of contaminated air generated in the structure;
  an extractor chamber positioned adjacent said inlet aperture for receiving the contaminated air extracted from said structure;
  a first filter means for removing contaminants from air passing therethrough disposed in the housing adjacent said extractor chamber;
  a second filter means for removing contaminants from air passing therethrough positioned in spaced relationship from said first filter means and defining an intermediate chamber between said first and second filter means;
  detector means engaged with said intermediate chamber for detecting the level of concentration of contaminants in the air passing through said chamber;
  an outlet aperture disposed in said housing for passing filtered air; and
  means to direct the contaminated air from within said structure through the inlet aperture and into the extractor chamber of said housing whereby the contaminated air passes through said first and second filter means and intermediate chamber for removal of at least a portion of the contaminants, and then to direct the filtered air through said outlet aperture.

14. The apparatus according to claim 13 wherein the housing is positioned above a work structure.

15. The apparatus according to claim 13 wherein the apparatus is positioned below said work structure.

16. The apparatus according to claim 13 wherein at least one filter means is provided with contaminant detector means.

17. The apparatus according to claim 13 wherein the detector means is used for the purpose of determining when a filter means positioned upstream and adjacent thereto is saturated with the contaminants.

18. The apparatus according to claim 13 wherein the filter means are removable and interchangeable.

19. The apparatus according to claim 13 wherein the means to direct the contaminated air is positioned adjacent the inlet aperture for the purpose of increasing the pressure of air passing through the filter means.

20. The apparatus according to claim 13 wherein the means to direct the contaminated air is positioned adjacent the outlet aperture whereby the contaminated air generated in the structure is drawn through the filter means.

* * * * *